United States Patent
Lüken

(10) Patent No.: US 7,274,687 B2
(45) Date of Patent: Sep. 25, 2007

(54) SIGNALING METHOD AND ARRANGEMENT

(75) Inventor: Joachim Lüken, München (DE)

(73) Assignee: Siemens Aktiengesellschaft, Munich (DE)

( * ) Notice: Subject to any disclaimer, the term of this patent is extended or adjusted under 35 U.S.C. 154(b) by 623 days.

(21) Appl. No.: 10/491,674

(22) PCT Filed: Sep. 12, 2002

(86) PCT No.: PCT/DE02/03403

§ 371 (c)(1),
(2), (4) Date: Apr. 1, 2004

(87) PCT Pub. No.: WO03/032654

PCT Pub. Date: Apr. 17, 2003

(65) Prior Publication Data

US 2004/0264437 A1     Dec. 30, 2004

(30) Foreign Application Priority Data

Oct. 1, 2001   (DE) ................................ 101 48 469

(51) Int. Cl.
*H04L 12/66*     (2006.01)

(52) U.S. Cl. ........................ 370/352; 370/389; 370/401

(58) Field of Classification Search ........ 370/352–356, 370/373, 384–385, 389, 400–401, 410, 426, 370/496

See application file for complete search history.

(56) References Cited

U.S. PATENT DOCUMENTS 6,876,646 B1 *   4/2005   Dore et al. .................. 370/352
7,142,534 B1 *   11/2006  Whent et al. ............... 370/352
7,190,959 B2 *   3/2007   Palmer et al. .............. 455/445

FOREIGN PATENT DOCUMENTS

WO    WO 01/65808 A2    9/2001

* cited by examiner

*Primary Examiner*—Binh K. Tieu

(57) ABSTRACT

The invention relates to a signaling method for the transmission of signaling information within the frame of a voice transmission or multimedia transmission via an IP network of the SIP-T type, which is connected to at least one public telecommunication network, whereby a first ISUP message, coded in a national format and a second ISUP message, coded in the international ITU-T format, are transmitted with the SIP-T messages.

7 Claims, 1 Drawing Sheet

| PSTN network 1 | | IP network | | PSTN network 2 |
|---|---|---|---|---|
| national ISUP (e.g. German Telekom ISUP) |  MGC 1 | SIP-T with embedded national and international ISUP |  MGC 2 | national ISUP (e.g. ANSI ISUP) | national network 1                international network              national network 2 national ISUP (e.g.              international ISUP                  national ISUP
German Telekom ISUP)             e.g. ISUP '92                       (e.g. ANSI ISUP)

PSTN network 1                   IP network                          PSTN network 2 national ISUP (e.g.              SIP-T with embedded                 national ISUP
German Telekom ISUP)             national and                        (e.g. ANSI ISUP)
                                 international ISUP

SIGNALING METHOD AND ARRANGEMENT

CROSS REFERENCE TO RELATED APPLICATIONS

This application is the US National Stage of International Application No. PCT/DE02/03403, filed Sep. 12, 2002 and claims the benefit thereof. The International Application claims the benefits of German application No. 10148469.0 DE filed Oct. 1, 2001, both of the applications are incorporated by reference herein in their entirety.

FIELD OF INVENTION

The invention relates to a signaling method according to the preamble of claim 1 and an arrangement for implementing this method.

BACKGROUND OF INVENTION

In modern telecommunication networks—in particular digital fixed networks such as ISDN, or also in the mobile radio standards GSM (Global System for Mobile Communication) and UMTS (Universal Mobile Telecommunication System)—the Signaling System No. 7 (also known as CCS7=Common Channel Signaling System 7) is used. This refers to a modular digital signaling system which is based on the separate transmission of user information and control information. This gives rise to a network exclusively for signaling information which is separated not only logically, but also physically from the lines for user data transmission.

A fundamental concept of this signaling system consists in the subdivision of the CCS7 functions into MTPs (Message Transfer Parts) which are consistent for all applications in the bottom three of the four protocol layers, and application-specific UPs (User Parts) on the top layer. ("User", in this context, is understood to mean not a subscriber, but an entity using the signaling system in the network.)

To allow the use of services and service features in ISDN which result from the integration of telephone and data services, different variants of what are termed ISUPs (ISDN User Parts) have been created. With ISUPs, it is mostly data for the setup and cleardown and for the monitoring of circuit-switched B-channel connections which is transmitted between the network nodes in the ISDN. The ISUPs are structured with certain specific characteristics at national level within the framework of the standardization specifications published by the ITU. In parallel with this, international ISUPs, as they are called, have been created for the signaling of international telecommunication connections.

In traditional ISUP networks, the interworking between the ISUP variants for international connections is implemented in an international gateway. For international calls, the outgoing international gateway converts the national ISUP into the ITU-T-compliant international ISUP. In the destination network, this international ISUP is converted once again into a national ISUP in the incoming international gateway.

For some time now voice transmission via IP-based data networks (VoIP=Voice over IP), in particular the Internet, has attracted increased attention as a special telecommunication method. Whereas originally considerable cost savings had been expected and had stimulated the development efforts aimed at implementing suitable interfaces and other system components, today the advantageous opportunities for using added value services take center stage.

In connection with the development of VoIP, convenient services are increasingly being implemented and made available, such as, for example, videoconferences comprising a number of subscribers (multicasting). For this, SIP (Session Initiation Protocol) is available as an internationally standardized signaling protocol for setting up a call between subscribers. In contrast to fixed network subscribers, the location of a SIP subscriber is not tied to a specific line; rather, it is not restricted geographically thanks to a flexible registration scheme. Therefore, the main function of SIP is to discover the current location of the called subscriber. With the call setup (session setup), SIP transports a session description which allows the subscribers to negotiate the type of communication (e.g. audio or video) for this session.

SIP-T (i.e. SIP for telephones) is a SIP protocol extension enabling transparent transport of ISUP signaling information over a VoIP network. SIP-T thus guarantees feature transparency for subscribers that are connected to PSTN/ISDN exchanges.

However, the implementation of SIP-T requires that the ISUP protocol variant is identical at the entry to and exit from the VoIP network, because no conversion of ISUP protocol elements can be performed in the VoIP network. Thus, if a network provider A wants to handle both internal network traffic and external traffic to a network provider B via the VoIP network, an interworking problem results because the ISUP variants in the networks A and B are different in the majority of cases.

SUMMARY OF INVENTION

The object of the invention is therefore to specify an improved method by means of which different ISUP variants can be operated with ease via a SIP-T network.

A further object is to provide a suitable arrangement for implementing said method.

These objects are achieved by a signaling method with the features recited in claim 1 and an arrangement according to claim 3.

By means of this mechanism two ISUP messages in each case are transmitted transparently with each SIP-T message concerned, specifically with the first ISUP message coded according to the national IS UP variant and the second ISUP message coded in the international ITU-T format.

For the international format, the base value in the ISUP mime content of the SIP-T message is specifically set to "itu-t92+". This ensures that the recipient can interpret the ISUP message since if the first format cannot be interpreted, the international format can be used instead. It can be assumed that the international ITU-T ISUP is available in at least all industrial countries and newly industrialized countries of every PSTN exchange.

The invention therefore offers a simple solution for the interworking problem, because the sender of the particular message simply offers the receiver two "languages"; the first "language" may not be supported by the receiver, but to make up for this the second "language" can be used worldwide and always guarantees a reliable connection setup.

BRIEF DESCRIPTION OF THE DRAWINGS

In order to explain and illustrate the invention further, reference is made to FIGS. 1 and 2.

DETAILED DESCRIPTION OF INVENTION

Figure 1:
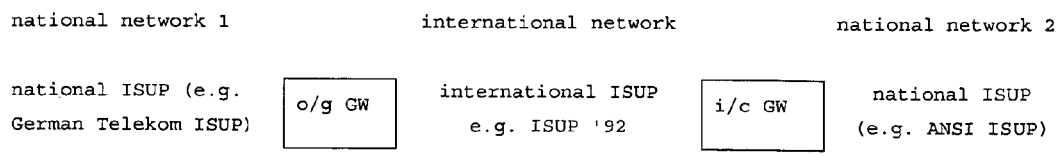
FIG. 1 shows the above mentioned interworking scenario between different ISUP variants in an international gateway in conventional ISUP networks.

FIG. 1 illustrates how, in the signaling between three networks, namely a first national network "national network 1", an international network "international network", and a second national network "national network 2", the outgoing international gateway "o/g GW" converts, for example, the national ISUP "German Telekom ISUP" into the international ISUP "ISUP'92". At the point of transition between the international network and the second national network (destination network), a further conversion into the ANSI ISUP is performed in the incoming international gateway "i/c GW". In this case, in fact, no signaling via a SIP-T network is involved.

Figure 2:
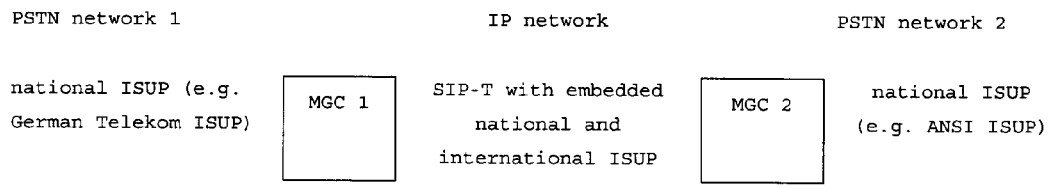
FIG. 2 shows an interworking variant according to the invention.

FIG. 2 shows a signaling sequence in the context of a VoIP transmission mechanism between a first public network "PSTN network 1", an IP network "IP network" and a second public network "PSTN network 2", whereby the terms "national network" and "public network" in FIGS. 1 and 2 are to be understood largely as synonymous. However, in the present arrangement the communication takes place via a SIP-T network.

In the arrangement according to FIG. 2, the functions of the outgoing and incoming international gateway shown in FIG. 1 are handled by a first and second media gateway controller MGC1 and MGC2 respectively. In the example, German Telekom ISUP and ANSI ISUP are again assumed as national ISUPs.

The embodiment of the invention is not restricted to these combinations and ISUP variants, but is equally possible in a plurality of variations which lie within the scope of action by persons skilled in the art.

The invention claimed is:

1. A signaling method for transmitting signaling information within the framework of a voice or multimedia transmission, comprising:
    coding—information into a first ISUP message, the first ISUP message coded in accordance to a national format;
    coding—the information into a second ISUP message, the second ISUP message coded in accordance to an international ITU-T format, the national format is different than the international-ITU-T format; and
    transmitting the first ISUP message and the second ISUP message with a SIP-T message,
    whereby the information is coded in a plurality of ISUP messages that are transmitted by the SIP-T message.

2. The signaling method according to claim 1, wherein the signaling information is transmitted via an IP network of the SIP-T type connected to at least one public telecommunication network.

3. The signaling method according to claim 2, wherein a base value in a ISUP mime content of the SIP-T message is set to "itu-t92+" for coding in the international ITU-T format.

4. An arrangement for implementing a signaling method, comprising:
    an IP network of an SIP-T type; and
    at least one media gateway controller establishing the connection to a public telecommunication network, in which a controller for a parallel provision of a first and second ISUP message in conjunction with a SIP-T message is implemented such that a SIP-T message includes a first ISUP message with information coded in a first format and includes a second ISUP message with the information coded in a second format, the first and second format being different.

5. The arrangement according to claim 4, wherein the first ISUP message and the second ISUP message are different.

6. The signaling method according to claim 2, wherein the first ISUP message and the second ISUP message are different.

7. The signaling method according to claim 2, wherein a receiving device receives the SIP-T message and uses the second ISUP message when the device does not recognize the national format coding of the first ISUP message.

* * * * *